May 11, 1965
G. C. SPARKS
3,182,789
DISPENSING PACKAGE
Filed June 29, 1960
2 Sheets-Sheet 1
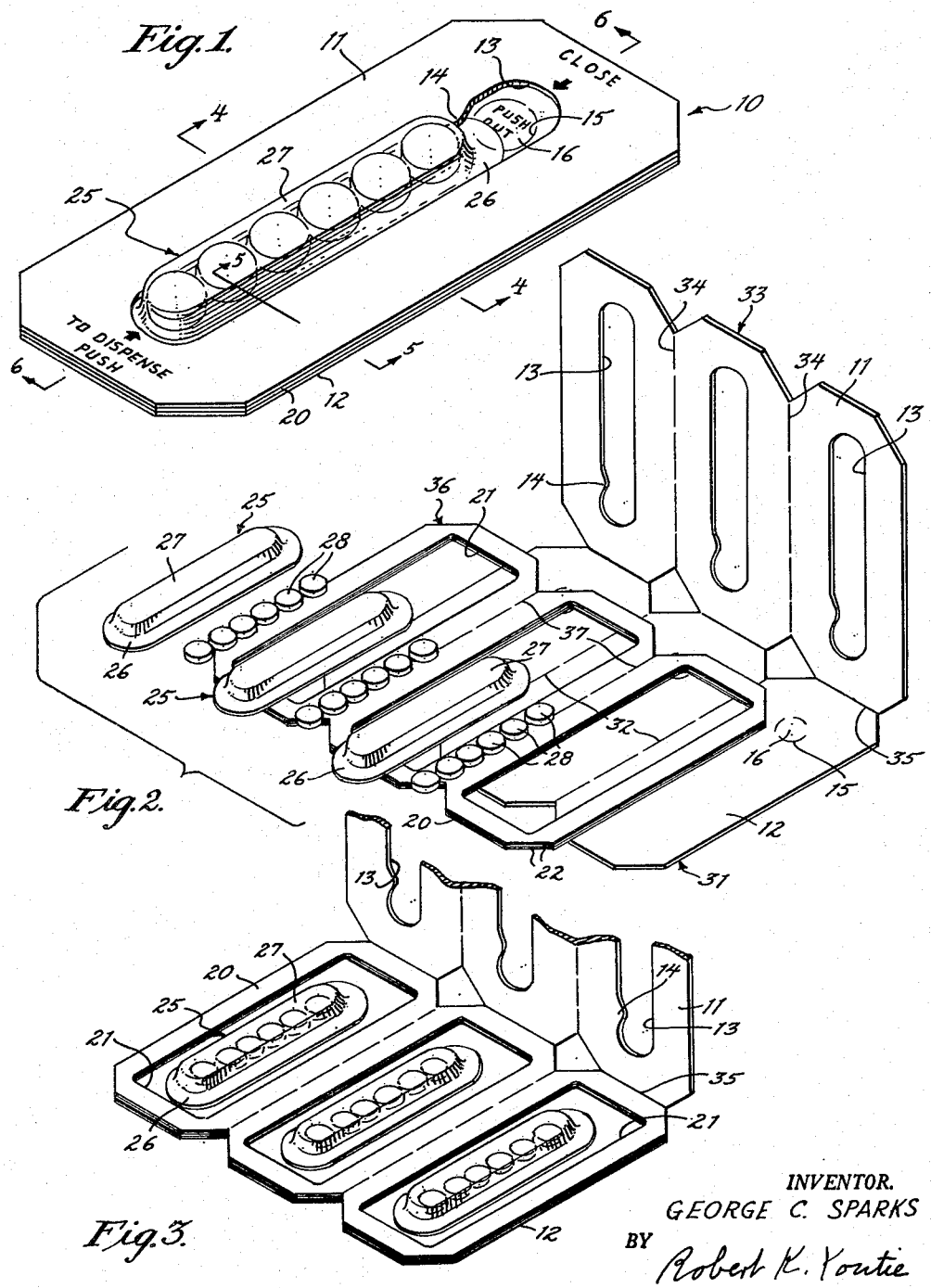
INVENTOR.
GEORGE C. SPARKS
BY
Robert K. Youtie
ATTORNEY.

May 11, 1965   G. C. SPARKS   3,182,789
DISPENSING PACKAGE
Filed June 29, 1960   2 Sheets-Sheet 2
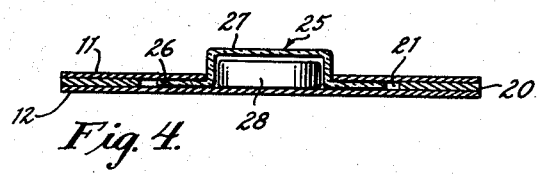
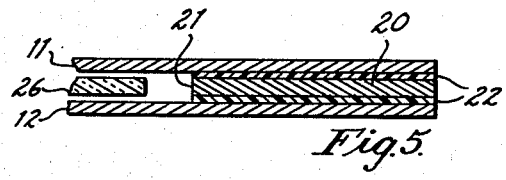
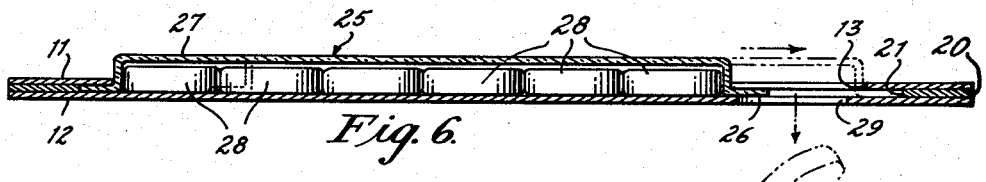
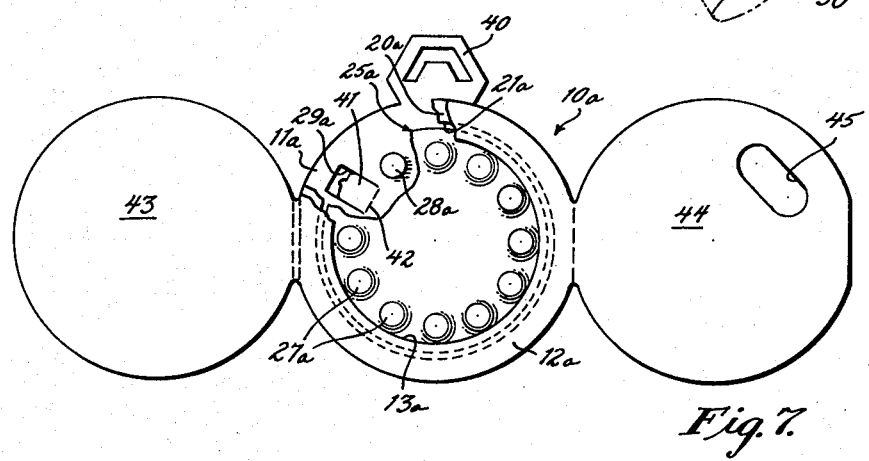
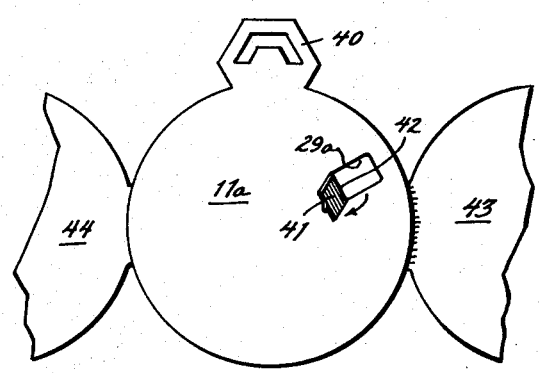
INVENTOR.
GEORGE C. SPARKS
BY Robert K. Youtie
ATTORNEY.

United States Patent Office 3,182,789
Patented May 11, 1965

3,182,789
DISPENSING PACKAGE
George C. Sparks, Erdenheim, Pa.
(11 Alumni Ave., Harleysville, Pa.)
Filed June 29, 1960, Ser. No. 39,692
2 Claims. (Cl. 206—42)

This invention relates generally to packaging, and includes a novel method of packaging and a unique package resulting therefrom. The instant invention is especially concerned with packages of a type similar to that disclosed in copending patent application Serial No. 587,143, filed May 24, 1956, now Patent No. 2,971,638, and comprehends improvements thereover.

In manufacturing packages of this type, as is well-known to those versed in the art, the packages must be formed in groups of substantial size to achieve economy. Substantial difficulties are presented in manufacture employing convenional adhesives or glue, there being considerable waste, dripping and messiness, often undesirable sticking together of paperboard, and the primary difficulty being inability to accurately control the application of the glue to the confines of a specific predetermined area. Also, conventional gluing involves substantial drying time, causes uneven shrinkage and distortion of the paperboard, as well as discoloration and other damage to printed matter. Conventional gluing operations also require immediate assembly, to insure optimum adhesive action of the glue, which considerably limits the permissible choice of operational sequence.

If it is desired to employ reactivatable or heat-sealable coatings over an entire surface of paperboard, to avoid the difficulties in pattern application of glue, additional difficulties are encountered, such as undesirable sticking together of the sheets, and toxicity of the adhesive in contact with the packaged goods. Further, precoating with heat-sealable material causes thin paperboard sheets to buckle, and be of varying thickness and moisture content, so that prior printing is distorted and discolored, and the sheets are most difficult to handle for subsequent printing.

It is therefore one object of the present invention to provide a dispensing package and method of making the same which overcome the above-mentioned difficulties, producing a neat, attractive, entirely safe and reliably operable dispensing package.

It is a more particular object of the present invention to provide a highly advantageous method of packaging wherein any desired pattern of adhesive is positively and accurately obtained, all without the difficulties inherent in applying liquid adhesive.

The present invention further contemplates the provision of a novel dispensing package manufactured according to the instant method.

Still another object of the present invention resides in the provision of a novel package resulting from the instant method of manufacture wherein the advantageous characteristics noted in the preceding paragraphs are combined with the provision of spacer means interposed between the adhesively secured sheets.

Other objects of the present invention will become apparent upon reading the following specification and referring to the accompanying drawings, which form a material part of this disclosure.

The invention accordingly consists in the features of construction, and combinations and arrangements of elements and method steps, which will be exemplified in the following description, and of which the scope will be indicated by the appended claims.

In the drawings:

FIGURE 1 is a top perspective view showing a dispensing package constructed in accordance with the teachings of the present invention;

FIGURE 2 is a perspective view showing the elements of a group of packages of the present invention in exploded condition;

FIGURE 3 is a perspective view showing the elements of FIGURE 2 in an intermediate stage of manufacture;

FIGURE 4 is a transverse sectional view taken substantially along the line 4—4 of FIGURE 1;

FIGURE 5 is an enlarged fragmentary sectional view taken substantially along the line 5—5 of FIGURE 1;

FIGURE 6 is a longitudinal sectional view taken substantially along the line 6—6 of FIGURE 1, and illustrating an operative dispensing condition in dot-and-dash outline;

FIGURE 7 is a plan view showing a slightly modified package constructed in accordance with the teachings of the present invention, with parts broken away for clarity of understanding; and FIGURE 8 is a partial rear plan view showing the package of FIGURE 7.

Referring more particularly to the drawings, and specifically to FIGURES 1–6 thereof, a dispensing package is there generally designated 10 in FIGURE 1, and may be of a relatively flat, elongate over-all configuration.

The dispensing package 10 includes a pair of generally flat, front and back outer walls 11 and 12, respectively, arranged in superposed or facing relation. The outer sheets or walls 11 and 12 may be generally congruent to each other.

The front or top outer sheet or wall 11 is formed with an elongate, longitudinally extending through opening or hole 13. The opening 13 is arranged centrally of the front sheet 11, being spaced inward from the bounding edges thereof and is provided along one side region adjacent to and spaced from one end of the opening with an inward extension or detent 14, see FIGURE 1. The extension or detent 14 may assume the formation of a smooth protuberance extending laterally into the opening 13.

The back outer sheet 12 may be substantially imperforate, and provided with a generally circular line of weakening or score 15 located for arrangement in registry with the region of front-wall opening 13 between the inward extension 14 and adjacent end of the front-wall opening. Thus, the region 16 of back wall 12 bounded within the severable score line 15 underlies one end region of the front-wall opening 13.

The front and back walls or sheets 11 and 12 may advantageously be fabricated of suitable paperboard or card stock adapted to be printed, die-cut and scored.

Interposed between the front and back sheets 11 and 12 is an intermediate sheet 20, which may have its peripheral outline of a configuration congruent to that of the front and back sheets. However, the intermediate sheet 20 has a central opening or hole 21 generally similar to but larger than the front-sheet opening 13, as is evident from FIGURES 4 and 6. Thus, it is seen that the bounding edge of the intermediate-sheet opening 21 is spaced outward throughout its extent from the bounding edge of the front-sheet opening 13, and that the marginal bounding region of the front-sheet opening extends inward throughout its extent beyond the intermediate sheet, so as to spacedly overlie the back sheet 12.

The intermediate sheet 20, see FIGURE 5, is provided on each of its faces with a layer or coating of reactivatable adhesive 22, such as thermoplastic material. The adhesive 22 entirely covers each face of the intermediate sheet 20, and adhesively secures the latter to the inner surfaces of the front and back sheets, respectively. Thus, the coated intermediate sheet 20 serves to both adhesively secure the front and back sheets 11 and 12 in their facing relation throughout a specific predetermined configuration, and may also serve to space the front and back sheets apart according to the thickness of the intermediate sheet.

While the intermediate sheet 21 is preferably fabricated of suitable paperboard or card stock and entirely coated on both its faces with thermoplastic adhesive or heat-sealable material, it is appreciated that the intermediate sheet may be formed of other suitably coated sheet material, or may be entirely fabricated of thermoplastic-adhesive material.

A carrier sheet is generally designated 25 and includes a generally planar peripheral margin 26 received in the intermediate-sheet opening 21, and a central upset or domed portion 27 extending forward or outward through the front-sheet opening 13 beyond the front sheet. The carrier sheet 25 is generally elongate and arranged longitudinally within the elongate intermediate-sheet opening 21, but is shorter than the latter opening, and also shorter than the front-sheet opening 13. As best seen in FIGURES 4 and 6, the peripheral margin 26 of the carrier sheet 25 is slidably received between the back sheet 12 and the marginal portion of the front sheet 11 bounding the opening 13, while the upset central portion 27 extends forward or outward closely but slidably between the side edges of the front-sheet opening 13. Thus, the carrier sheet 25 is shiftable longitudinally within the intermediate-sheet opening 21 and the front-sheet opening 13, as between its retracted, solid-line position in FIGURE 6, and the dot-and-dash-outline position therein. The carrier-sheet margin 26 is slidably retained within the intermediate-sheet opening 21 by the marginal portion of the front sheet 11 bounding the opening 13.

Interiorly within the upset central portion 27 of the carrier sheet 25, between the latter and the back sheet 12, are located a plurality of pills or articles 28 to be dispensed, as will appear presently. The carrier sheet 25, in its closed or retracted position is located with its upset portion 27 just on one side of the detent or extension 14, with the latter extending at least slightly into the path of shifting movement of the upset carrier-sheet portion.

In use, it is only necessary to punch out the circular portion 16, and then to push the carrier sheet 25 to its phantom position of FIGURE 6. This places one end region of the upset carrier-sheet portion 27 over the outlet opening 29 defined upon removal of the push-out portion 16 to permit the gravitational passage therethrough of an article, as at 30. This shifting movement of the carrier sheet 25 to dispense a pill is yieldably resisted by engagement of the detent or protuberance 14 with one side of the upset portion 27. However, the detent 14 and upset portion 27 may be slightly resiliently deformable to permit such shifting movement of the carrier sheet, and to return to substantially their original condition upon retraction or closing movement of the carrier sheet. The detent 14 thus serves to effectively prevent inadvertent shifting movement of the carrier sheet 25 to its open or dispensing position. With the carrier sheet 25 in its phantom, dispensing position of FIGURE 6, one or more articles 28 may be dispensed, as desired; and, the dispensing operation may be repeated when required, until all the pills have been dispensed.

It will now be appreciated that a convenient, simple-to-use, attractive and inexpensive dispensing package is provided, wherein operation is entirely reliable, and the contents are effectively protected against contamination by foreign matter, as well as protected against contact with the adhesive material.

The carrier sheet 25 is preferably fabricated of transparent plastic material for its ease of formation and visual access and for other reasons, but other suitable materials may also well be employed, if desired.

In the exploded condition of FIGURE 2, it will be seen that a group or gang 31 of back sheets 12 are arranged in side-by-side relation and detachably secured together by score lines 32, while a group or gang 33 of front sheets 11 are arranged in side-by-side relation with each other and detachably secured together by scores 34. Further, the group or gang 31 is hingedly connected to the group or gang 33 by a series of aligned scores 35. In addition, a group or gang 36 of intermediate sheets 20 are arranged in side-by-side relation and connected together by detachable scores 37. In assembly, with the carrier sheets 25 and their contained articles 28 arranged within the intermediate-sheet openings 21, the front and back sheets 11 and 12 are folded onto opposite sides of the intermediate sheets, with the upset carrier-sheet portions 27 extending through the front-sheet openings 13. In this condition, it is only necessary to apply heat to effect activation of the adhesive 22 and adhesive sealing of the front and back sheets to the intermediate sheet. It is, of course, appreciated that the sequence of steps may be otherwise than as described hereinbefore, without departing from the method of the present invention. For example, the detachable perforations 32 of the back sheets 12, detachable perforations 37 of the intermediate sheets 20, and the detachable perforations 34 of the front sheets 11 may be formed subsequent to the adhesive activation, if desired.

In the embodiment of FIGURES 7 and 8 there is shown a dispensing package generally designated 10a, including back and front sheets 11a and 12a adhesively secured in facing relation by an intermediate sheet 20a having heat-sensitive adhesive surfaces. The back sheet 11a may be of generally circular configuration, and may have a radial extension 40 simulating a watch stem or knob. Formed in the back sheet 11a is an outlet opening 29a provided with a closure tab or flap 41 swingable into and out of closing relation with the outlet, as about a fold line 42.

The front sheet 12a is of generally circular-outline configuration congruent to that of the back sheet 11a, and is provided with a generally circular concentric hole or opening 13a. The intermediate sheet 20a is also of an outline configuration congruent to that of the front and back sheets 11a and 12a, and is formed with a concentric through opening 21a of a size larger than that of the front-wall opening 13a, so that the bounding edge of the intermediate-wall opening is spaced outward from the bounding edge of the front-wall opening.

A generally circular carrier sheet 25a is arranged within the intermediate-wall opening 21a having its peripheral margin slidably interposed between the back and front sheets 11a and 12a. That is, the peripheral margin of the carrier sheet 25a slidably underlies the marginal portion of front sheet 12a bounding the opening 13a. A plurality of upset portions or domes 27a are formed in the carrier sheet 25a, preferably located in a circular arrangement and extending forward through the front-wall opening 13a beyond the front wall or sheet 12a proximate to the bounding edge of the front-wall opening. Each of the upset portions 27a may carry one or more articles or pills 28a to be dispensed.

The dispensing procedure is similar to that of the first-described embodiment. It is only necessary to swing the closure tab 41 outward to an open position, as shown in FIGURE 8, and then to slidably rotate the carrier sheet 25a sufficiently to locate over the outlet opening 29a a dome 27a containing a pill 28a. The contained pill may then pass gravitationally outward or rearward through the outlet opening 29a. In order to dispense additional pills, it is necessary to additionally rotate the carrier sheet 25a. The closure tab 41 may be swung to closed position, during nonuse of the dispensing package 10a to prevent accidental removal of a pill upon inadvertent sliding rotation of the carrier sheet 25a. However, such inadvertent rotation of the carrier sheet is effectively prevented by the provision of one or more side flaps 43 and 44 extending outward from edge regions of the outer sheets 11a and 12a and hingedly connected to the latter for swinging movement into and out of overlying relation with the carrier sheet 25a. One of the side flaps, say 44, may be provided with a finger opening or hole 45 adapted to overlie the outlet opening 29a and an additional region to provide sufficient finger access therethrough for effecting the required rotation of carrier sheet 25a to dispense a pill. Also, the flaps 43 and 44 provide area for advertising copy, instructions, and required printed matter. The method of manufacturing the dispensing package 10a is similar to that of the package 10, arranging the outer sheets 11a and 12a on opposite sides of the dry heat-activatable plastic-surfaced intermediate sheet 20a, with the carrier sheet 25a and its contained pills located in the intermediate-sheet opening 21a, and applying sufficient heat to effect adhesive engagement of the intermediate sheet with both the back and front sheets.

From the foregoing it is seen that the present invention provides a dispensing package and method of making the same which fully accomplishes their intended objects and are well-adapted to meet practical conditions of manufacture, distribution and use.

Although the present invention has been described in some detail by way of illustration and example for purposes of clarity of understanding, it is understood that certain changes and modifications may be made within the spirit of the invention and scope of the appended claims.

What is claimed is:

1. A dispensing package comprising a back sheet, a front sheet in facing relation with said back sheet, said front sheet having an opening spaced inward from its peripheral edges, an intermediate sheet sandwiched between said front and back sheets and having its surfaces in respective adhesive securement with said front and back sheets, said intermediate sheet having an opening of a size and location conforming to the opening of said front sheet with the bounding edges of said intermediate-sheet opening being spaced outward from the bounding edges of said front-sheet opening, and a carrier sheet slidably received in said intermediate-sheet opening having opposite edges slidably interposed between said front and back sheets underlying the bounding edges of said front-sheet opening, said carrier sheet having a medial region upset away from said back sheet for containing an article to be dispensed, said back sheet being formed with an outlet opening in line with the sliding movement of said carrier sheet upset region for receiving therefrom and passing said article, said openings being of elongate configuration, said carrier sheet being shorter than said openings for longitudinal sliding movement therein, and said outlet being located in registry with one end of said openings for receiving said article upon sliding movement of said carrier sheet toward said one end.

2. A dispensing package comprising a paperboard back sheet, a paperboard front sheet in facing relation with said back sheet, said front sheet having a central opening, an intermediate sheet sandwiched between said front and back sheets and having heat-activatable adhesive surfaces in respective adhesive securement with said front and back sheets, said intermediate sheet having an opening configured similar to but larger than the opening of said front sheet with the bounding edge of said intermediate-sheet opening being spaced outward from the bounding edge of said front-sheet opening, a plastic carrier sheet slidably received in said intermediate-sheet opening having edge portions slidably interposed between said front and back sheets underlying the bounding edges of said front-sheet opening, said carrier sheet being formed with at least one upset portion extending upwardly beyond said front sheet through the opening thereof for containing an article to be dispensed, said upset portion being slidably engageable with the bounding edges of said front-sheet opening, said back sheet being formed with an outlet opening in line with the sliding movement of said upset portion for receiving and passing said article, said intermediate- and front-sheet openings being of elongate configuration, said carrier sheet being shorter than said openings for longitudinal sliding movement therein, said outlet opening being located in registry with one end of said intermediate- and front-sheet openings for receiving said article upon sliding movement of said carrier sheet toward said one end, and a projection on the bounding edge of said front-sheet opening extending into said opening and engageable with the upset portion of said carrier sheet to yieldably hold the latter against sliding movement and prevent inadvertent passage of said article through said outlet opening.

References Cited by the Examiner

UNITED STATES PATENTS

| 2,750,719 | 6/56 | Wandelt | 206—80 |
| 2,796,985 | 6/57 | Gorton | 206—78 |
| 2,861,405 | 11/58 | Hanford | 206—80 |
| 2,874,836 | 2/59 | Wertepny | 206—78 |
| 2,892,541 | 6/59 | Hahn | 206—78 |
| 2,899,046 | 8/59 | Cox | 206—42 |
| 3,025,952 | 3/62 | Phipps | 206—78 |
| 3,063,557 | 11/62 | Scholl | 206—78 |

THERON E. CONDON, *Primary Examiner.*

EARLE J. DRUMMOND, GEORGE O. RALSTON, *Examiners.*